Sept. 25, 1962 J. HENRY-BAUDOT 3,056,056
SHADED POLE TYPE ELECTRIC MACHINES
Filed Dec. 16, 1958

INVENTOR
JACQUES HENRY-BAUDOT

ATTORNEY

United States Patent Office 3,056,056
Patented Sept. 25, 1962

3,056,056
SHADED POLE TYPE ELECTRIC MACHINES
Jacques Henry-Baudot, Cold Spring Harbor, N.Y., assignor to Printed Motors, Inc., New York, N.Y., a corporation
Filed Dec. 16, 1958, Ser. No. 780,755
Claims priority, application France Aug. 13, 1958
10 Claims. (Cl. 310—172)

This invention relates to improvements in or relating to rotating electrical machines described in my co-pending application Serial No. 761,144, filed September 15, 1958, and disclosing a disc-shaped A.C. asynchronous motor wherein the inductor comprises a multipolar winding made of flat conductors firmly adhering to an insulating surface and being formed by a prefabrication process, such as a printed-circuit technique, on both faces of an annular and thin insulating carrier, so that each face of the said carrier presents a pattern of half-turn conductors distributed thereon, and the pattern of each half-turn being such that interconnections from one face to the other one may be provided for completing the multipolar winding.

An object of the invention is to derive a motor of the so-called "Ferraris" type, otherwise called a "shaded-pole" motor. Such a motor, as is well known in conventional manufacture, has a stator formed with a single phase winding distributed over each pole in a group of several coils. At the same time, each pole space is provided with a short-circuited winding having an axis displaced by 30° up to 45° with respect to the axis of the principal pole.

A further object of the invention is to provide a two-face printed winding electrically equivalent to a conventional winding consisting of a number of partially overlapping sections in "steps" or "spans" or "sections" defined by the number of conductors to be bypassed when progressing from one conductor of "entry" to a conductor of "exit"; and more particularly, this object is to provide a two-face printed winding of this kind wherein the span of any half-section or group of half-turns is reduced from 180 electrical degrees to 120 electrical degrees. Such a shortening of "span" is called a reduction to two-thirds and the winding pattern resulting therefrom may be said to be a "two-third" winding.

More specifically, according to the invention in each section of a double-face winding, on each face, a space is reserved which is held free of conductors, such space extending to both sides of the electrical pole axis under consideration for each face.

As a further object of the invention in each of these free spaces, a short-circuit winding is printed defining the shaded pole desired for the section.

Figure 1:
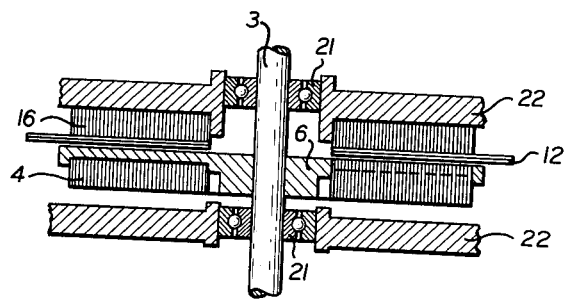
Figure 2:
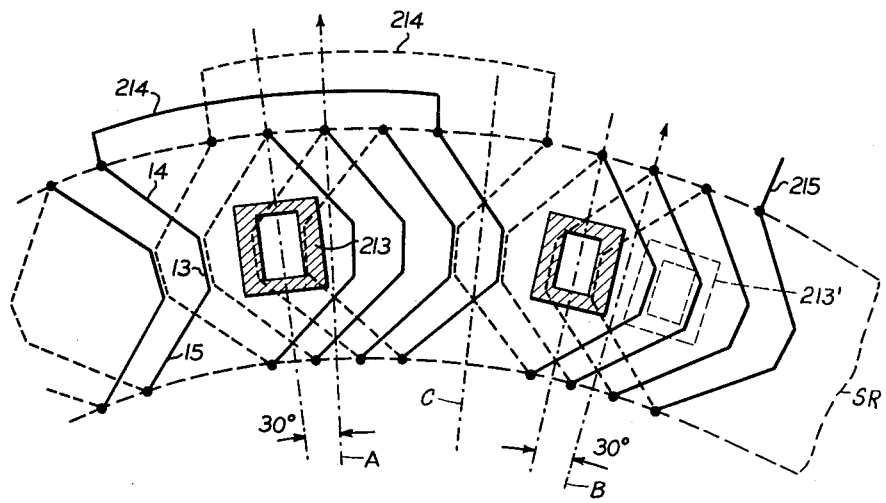

These and other objects of the invention will be more fully described in connection with the accompanying drawings in which FIG. 1 shows in cross section elevation, a type of motor such as described in co-pending application Serial No. 761,144, filed September 15, 1958. FIG. 2 shows diagrammatically part of a stator winding of the shaded pole type embodying certain features of the invention.

In FIG. 1, shaft 3 supports a rotor preferably of the squirrel-cage type developed into a plane, i.e., consisting of a certain number of radial or sensibly radial conductors terminating in two conductive rings, an internal and an external ring. These conductors are preferably formed together with these conductive rings by molding a conducting material into the recesses provided on one face of a disc-shaped magnetic structure. This magnetic structure consists of a spiral coil 4 of magnetic band or tape the edge of which has been previously indented to form these recesses. Hub 6 which embodies the inner ring may also be molded together with the conductors. Shaft 3 is supported on bearings 21 provided in flanges 22 of a housing. One of these flanges supports fixed thereon an annular stator. The stator consists of a double-face stator winding of the type stated above, glued or otherwise attached to one face of a magnetic ring consisting, for example, of a magnetic band coil which is not indented and which is glued or otherwise attached to flanges 22. The double-face series winding of this stator element can be provided as stated in the above mentioned co-pending application Serial No. 761,144, filed September 15, 1958, with taps distributed over its periphery and even with taps individually derived, as disclosed in the co-pending Serial No. 780,754 filed December 16, 1958, in order to establish entry and exit points for the windings of multipolar A.C. machines.

FIG. 2 merely serves to illustrate the invention in so far as the form and interconnections of conductors and selection of space for the shaded poles are concerned.

In FIG. 2, two sections of the winding of four turns each are represented. The pole step or pitch of each of these sections is determined by the length of the arc of interconnections 214 alternately established upon front and rear faces, respectively, of the dielectric support ring for the conductors printed or otherwise formed thereon. A segment of the flat support ring is shown in dotted lines at SR in FIGURE 2. The conductors shown are drawn in full lines for the front face of the ring and in dotted lines for the rear face. Each conductor, for example, consists of a radial portion 13 and inclined end portions 14 and 15. The two 4-turn windings of FIG. 2 form adjacent poles of opposite polarity, radial lines A and B passing through the pole axes of the two coils and line C passing through the neutral zone.

It is well understood, however, that the form of the conductors and, therefore, the form of the spirals or turns of the winding may be different without departing from the scope of the invention.

The arc between the lines A and B designated as the principal "pole axes" extends over 180 electrical degrees. The winding section, however, is formed only over two-thirds of such arc extension, by means of a step shortened by one-third. As a result, on each face, the group of conductors of one winding section cover only 120 electrical degrees. For each winding section, therefore, each face reserves a space covering 60 electrical degrees which does not carry winding conductors and is free to be printed over by a short-circuit winding such as indicated in FIG. 2 at 213 for the front face of the stator winding element. This applies of course to each of the winding sections of the stator shown. The axis of these short-circuit windings, each of which is formed as a simple metallization in the form of a closed ring, is displaced by 30 electrical degrees in a direction, for example, behind each principal pole axis with reference to the direction of rotation of the rotor. There is also indicated, for illustration sake, an exit point 215 for the current supply of the winding. The points drawn as large black circles along the external and internal peripheries of the stator ring designate the connections between the front and rear conductors in each winding section.

The short-circuit windings may be applied on either face of the stator element, with the same 30° displacement with respect to the pole axis.

From the foregoing it will be seen that the winding assembly comprising the supporting disc SR and the winding carried thereby is very thin, the winding on each face of the support being of a thickness or depth corresponding to a single-layer winding. The winding depth is not increased by the presence of the shading winding 213, since it is located within an area not occupied by the winding conductors 13—14—15, and because of this arrangement it is possible to form the shading winding simultaneously by the same printing process used in forming the winding conductors 13—14—15.

In the attached claims the term "smooth surface" refers to a single-plane surface which is devoid of slots or grooves.

I claim:

1. In a multipole rotating electrical machine, a rotor and at least one disc-shaped stator cooperating with said rotor through a flat airgap of substantially disc-shaped configuration, said disc-shaped stator comprising a disc-shaped magnetic structure having a flat smooth surface forming one end boundary of said airgap, a winding assembly attached to and covering said flat smooth surface and including a thin disc-shaped insulating support and a planar multipolar winding formed in several winding sections corresponding to the number of poles and extending over both faces of said disc-shaped support; the surface of each of said faces of said support being subdivided in a number of sectorial areas corresponding to the number of poles; each sectorial area of each face having bonded thereto a single-layer group of half-turn winding conductors and connected at their ends to a corresponding single-layer group of half-turn winding conductors bonded to a corresponding sectorial area on the other face of said support; adjacent groups of half-turn conductors of one face being separated from each other by a predetermined sectorial space free of said half-turn conductors; and a short-circuited single-layer planar winding bonded to the surface of said support within each of said free spaces on one face of the winding support.

2. A motor according to claim 1 wherein said rotor also includes a disc-shaped magnetic structure having a winding attached to one of its faces facing said stator winding.

3. A motor according to claim 1 wherein each of said free spaces extends over an arc of 30 to 45 electrical degrees.

4. A motor according to claim 1 wherein each of said short-circuited winding consists of a substantially rectangular closed ring and each of said half-turn conductors consist of a radial portion and inclined end portions at both ends thereof.

5. A motor according to claim 1 wherein each short-circuited winding is arranged displaced by 30 electrical degrees from the principal polar axis associated therewith, said displacement being in a direction opposite to the direction of rotation of said rotor.

6. A motor according to claim 1 wherein said winding support at the areas supporting said inclined end portions of the half winding extends beyond the disc-shaped magnetic structure associated with said support.

7. A shaded pole winding assembly comprising an insulating winding support formed of a thin and flat annular member and a planar multipolar winding formed in several winding sections corresponding to the number of poles and extending over both faces of said annular member; the surface of each of said faces of said support being subdivided in a number of sectorial areas corresponding to the number of poles, each sectorial area of each face having bonded thereto a single-layer group of half-turn winding conductors and connected at their ends to a corresponding single-layer group of half-turn conductors bonded to a corresponding sectorial area on the other face of said annular member; groups of half-turn conductors of one face being separated from each other by a predetermined sectorial space free of said half-turn conductors; and a short-circuited single-layer planar winding bonded to the surface of said annular member within each of said free spaces on one face of said winding support.

8. A winding element according to claim 7 wherein each of said free spaces extends over an arc of 30 electrical degrees.

9. A winding element according to claim 7 wherein each of said short-circuited windings consists of a substantially rectangular ring and each of said half-turn conductors consists of a middle portion arranged radially of said annular member and extending into inclined end portions at both ends thereof, the width of the conductor forming each short-circuited ring being substantially larger than the width of the half-turn conductors.

10. A winding element according to claim 7 wherein each short-circuited winding has a radial axis arranged displaced by 30 electrical degrees with respect to the axis of the principal pole winding associated therewith.

References Cited in the file of this patent

UNITED STATES PATENTS

| | | |
|---|---|---|
| 2,880,335 | Dexter | Mar. 31, 1959 |
| 2,886,880 | Eisler | May 19, 1959 |
| 2,920,574 | Sampietro | Jan. 12, 1960 |